Oct. 18, 1966  H. J. COHN  3,279,351
AUTOMATIC COFFEE MAKER
Filed Dec. 9, 1963  2 Sheets-Sheet 1
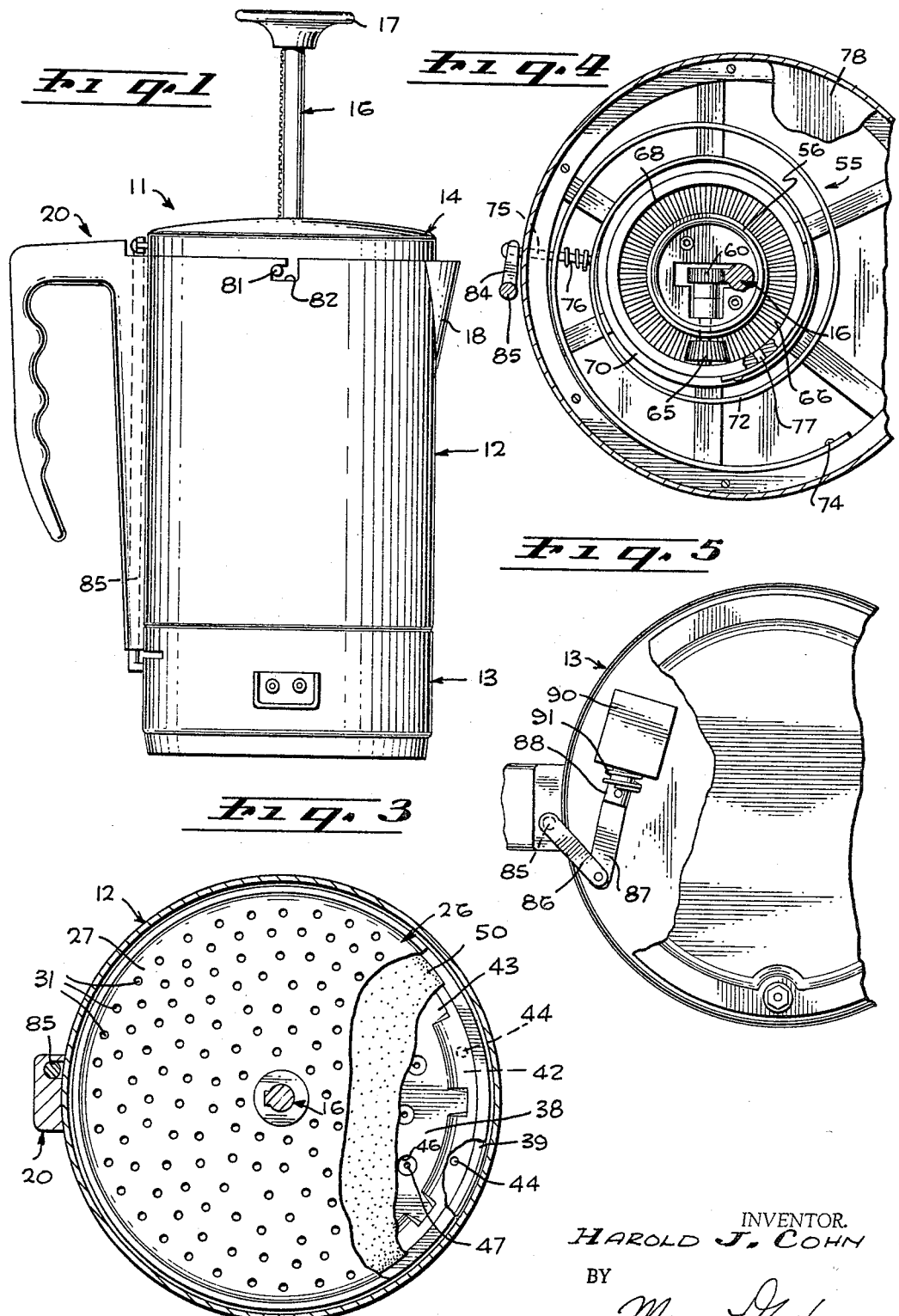
INVENTOR.
HAROLD J. COHN
BY
Maron Graham
ATTORNEYS

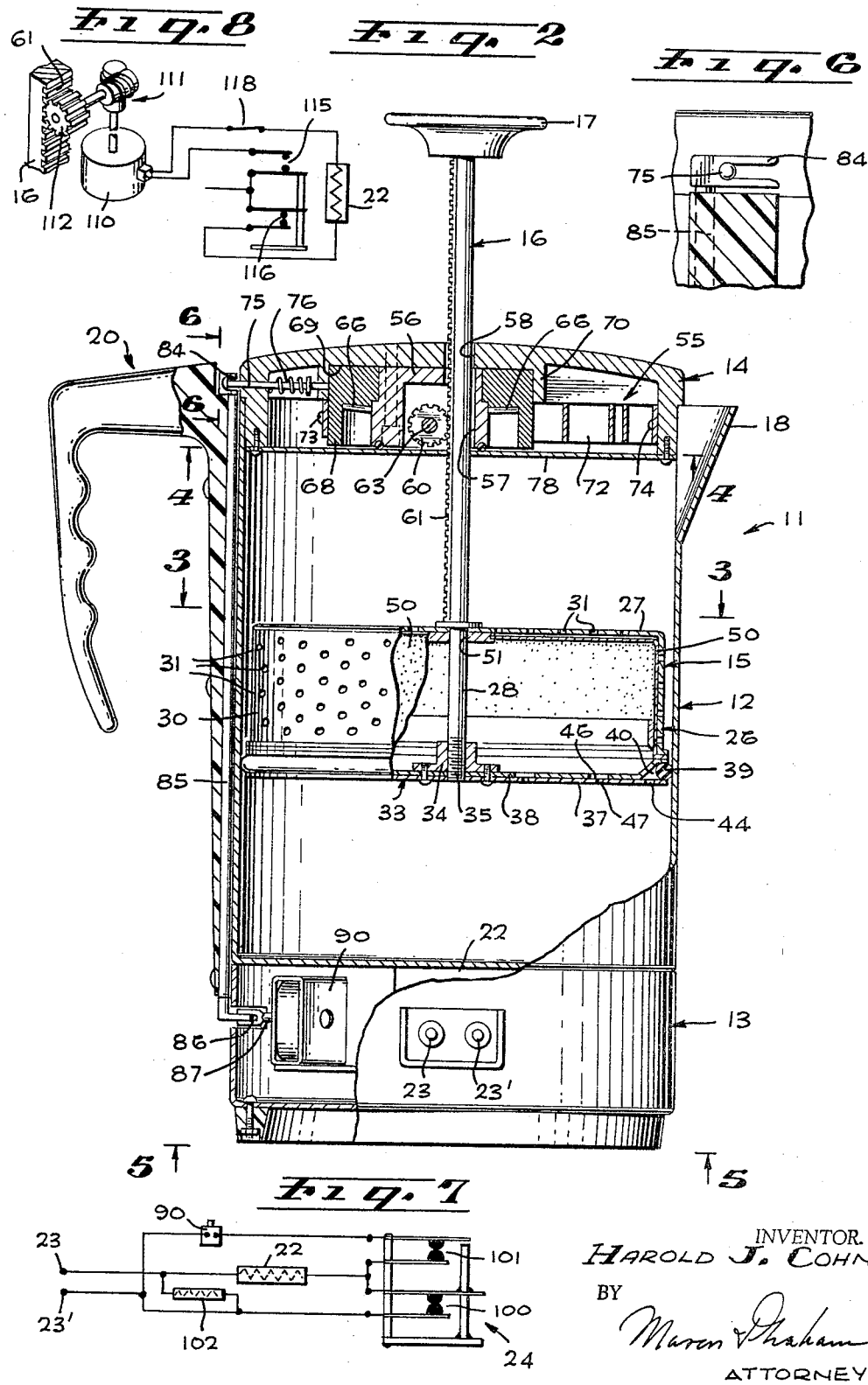

United States Patent Office 3,279,351
Patented Oct. 18, 1966

3,279,351
AUTOMATIC COFFEE MAKER
Harold J. Cohn, 826 Tigertail Road,
Los Angeles, Calif.
Filed Dec. 9, 1963, Ser. No. 329,107
3 Claims. (Cl. 99—282)

This invention has to do with coffee makers and more particularly with coffee-making devices wherein the beverage is produced by forcing water through a perforated plunger containing ground coffee. A device of this kind is disclosed in my copending application for patent, Serial No. 271,145, filed April 8, 1963, now Patent No. 3,158,-084, and the advantages of making coffee by such a device are set forth in that application.

An object of the invention is to provide an improved coffee maker of the general type indicated which, after it has been charged with water and coffee and set, is fully automatic.

More particularly, it is an object of the invention to provide a coffee-making device wherein a plunger adapted to contain ground coffee is forced through the body of water in a coffee pot-type container by novel means contained within the device itself.

Another object is to provide a coffee-making device of the type indicated which embodies a novel arrangement and combination of means for electrically heating the water, motor means for forcing a coffee-containing plunger through the body of water, and means for controlling the operation of the motor means whereby the same will be caused to operate only after the water in the device has reached a desired temperature.

A further object is to provide a novel spring-motor means for operating the plunger.

Another object is to provide a novel latch means for holding the motor means ineffective and a novel latch operating mechanism.

These and other objects will be apparent from the drawings and the following description. Referring to the drawings:

FIG. 1 is an elevational view of one side of a coffee-making device embodying the invention;

FIG. 2 is a vertical sectional elevational view of the device of FIG. 1, but on a larger scale;

FIG. 3 is a sectional plan view on line 3—3 of FIG. 2 with parts broken away;

FIG. 4 is an inverted sectional plan view on line 4—4 of FIG. 2;

FIG. 5 is a fragmentary inverted plan view on line 5—5 of FIG. 2;

FIG. 6 is a fragmentary detailed sectional view on line 6—6 of FIG. 1;

FIG. 7 is a wiring diagram; and

FIG. 8 is a schematic view of an alternate form of the invention.

More particularly describing the invention, numeral 11 generally indicates a coffee-making device or automatic coffee pot having an open-topped cylindrical container 12 which is joined to a hollow base 13 and which has a removable cover 14. The latter supports a hollow plunger 15 upon a rod 16 having a handle 17. The plunger has been shown in the drawings at a point intermediate the top and bottom of the container 12 approximately midway of its stroke. As will later appear, the plunger is initially positioned at the top of the container immediately adjacent the bottom of the cover 14, and, at the proper time, is caused to descend through heated water (not shown) in the container to the bottom thereof for the coffee-making operation.

Container 12 is provided with a formed spout 18 and opposite this is fitted with a handle 20. The latter is preferably made of a material having relatively poor heat conductivity as, for example, hard rubber or a suitable plastics.

The container 12 is adapted to hold a supply of water (not shown) which is to become the coffee beverage. An electric heating element 22 is mounted within the hollow base 13 for the purpose of heating the water to the required temperature and this is connected to a source of electric current by means of a conventional cord (not shown) and terminals 23, 23' on the outside of the base. A thermostat control 24 is included in the electrical circuit for disconnecting the heater from the source of current when the heater reaches the desired temperature, namely about 190 to 200° F.

The plunger 15 includes an inverted perforate cup 26 having a centrally apertured end wall 27 to receive the cylindrical portion 28 of the rod 16, and a perforate side wall 30 of cylindrical form and somewhat smaller in diameter than the inside diameter of the container 12. The cup is provided with a plurality of perforations 31 and these relatively small, being preferably of the order of about $\frac{1}{32}$ of an inch in diameter. The open end of the cup is closed by a removable wall 33 provided with a central, threaded boss 34 to mount the same on the threaded end 35 of rod 16. Wall 33 includes a plate 37 and an inner wall 38. In order to mount a resilient O-ring 39, wall 38 is formed to provide, in conjunction with plate 37, a peripheral groove 40 in which the O-ring is seated. Preferably the plate is provided with circumferentially spaced, radially opening pockets 42 provided between circumferentially spaced embossed portions 43 of the lower wall and with circumferentially spaced perforations 44 in the plate which communicate with the respective pockets behind the portion of the O-ring exposed therein. With this construction, as the plunger is forced downwardly, through water in the container, as will later appear, some of the water will enter the pockets through perforations 44 to force the O-ring radially outward into sealing engagement with the side wall of the container 12. This feature is more fully disclosed in my above-referred-to copending application.

To enable water to enter and hence pass through the plunger, I provide relatively large holes 46 in the wall 38 directly over small holes 47 in the plate 37, the latter holes being comparable in size to holes 31 in the cup.

In order to fully retain the finest particles of ground coffee in the plunger, I preferably provide a retainer or filter 50 which has a central aperture 51 to receive the rod 16. The filter may be made of cloth, paper or other suitable material although I prefer a stainless steel cloth for the purpose of 325 mesh which can be used repeatedly.

The cover 14 is provided with spring motor means 55 for moving the plunger through the body of water in the container from top to bottom thereof and this means includes a fixedly mounted support 56 which is apertured at 57 in alignment with an aperture 58 in the cover to pass the rod 16. A pinion 60 meshes with rack teeth 61 the rod, the pinion being fixed to a short shaft 63 journaled to support 56. The shaft carries a second pinion 65 fixed thereto. The latter meshes with and is designed to be driven by gear teeth 66 of a ring gear 68. The latter is seated in a circular recess 69 defined by support 56 and a wall 70 forming part of the cover.

Ring gear 68 is connected to be driven by a coiled flat spring 72, the inner end of which is secured to the ring gear at 73 and the outer end of which is secured to the cover at 74. Between the ends there are a suitable number of turns or convolutions of the spring.

A latch pin 75 mounted in the cover and biased inwardly by a spring 76 is adapted to enter a hole 77 in the periphery of the ring gear when the parts are in registration for the purpose of releasably locking the ring gear against rotation with the spring in wound condition. In order to set the mechanism, which involves winding the spring, the rod 16 is pulled relative to the cover 14 until the plunger is against an inner cover plate 78 provided on the underside of the cover. At this point the latch pin 75 registers with and enters the hole 77 in the ring gear and latches the parts against movement. Alternately, with the cover and plunger removed from the container, the spring may be wound and set by pushing down on the cover toward the plunger with the latter supported on any available surface. The container is provided with two diametrically opposite trunnions or pins 81 which are adapted to enter L-shaped slots 82 in the top of the container for the purpose of locking the parts together.

When the cover and plunger are replaced after winding the spring and latching the parts, the latch pin 75 is received in a forked lever 84 fixed to the upper end of a rod 85 journaled in the handle. The lower end of this rod has a lever section 86 which is connected by a link 87 to the plunger 88 of a solenoid 90. A spring 91 serves to yieldably maintain the parts in the position shown. Energization of the solenoid at the proper time serves to release the spring motor means 55 by turning rod 85 and thereby removing the latch pin from the ring gear. The plunger is then driven downwardly through the water in the container.

In the use of the coffee making device, the cover and plunger are removed and the container 12 filled or charged with water. The bottom wall 33 of the plunger is then unscrewed from the rod 16 and the basket filled with the desired amount of ground coffee and the wall replaced. The spring motor means is then wound and set in a manner as previously explained. The cover is then replaced and the device connected to a source of electrical energy.

Preferably the electric heating element 22 is initially energized and remains energized until the water in the container reaches a desired temperature of from 190 to 200° F. as determined by the thermostat 24. The latter then acts to open contacts 100 (FIG. 7) energizing solenoid 90. The thermostat within seconds then opens contacts 101 breaking the circuit to both the heater element 22 and solenoid 90. A warming element 102 remains energized to keep the liquid hot. Energization of solenoid 90 releases the spring motor mechanism in the manner previously described and the plunger begins its downward course of movement through the water to produce coffee. When the plunger has reached the bottom of the container, the coffee is made and can be poured.

Although I have shown and described a preferred form of the invention, I contemplate that various changes and modifications can be made therein without departing from the invention. Also, I contemplate that other means may be used for driving the plunger, such as an electric motor, for example. By way of example, in FIG. 8, I show diagrammatically a motor 110 which would be mounted in the cover 14 to drive the plunger bar 16 by a worm gear drive means 111 driving a pinion 112 which meshes with the rack 61 of the bar. Suitable gear reduction means (not shown), which may be built into the motor, may be provided and the over-all gear reduction may be such as to produce the desired plunger speed. The motor would be connected electrically to be energized by a thermostat switch through contacts 115 which close when the water in the device reaches the set temperature, the thermostat also serving simultaneously to open contacts 116 to open the circuit through the heater element 22. A limit switch 118 is provided to open the motor circuit at the end of travel of the plunger and this may be suitably located.

I claim:
1. In a coffee-making device, a container adapted to hold a charge of water, a cover for said container, a perforate plunger adapted to hold a charge of ground coffee and fitting within said container for movement from end to end thereof, said cover being apertured, a plunger-supporting rod received through the aperture in the cover and having rack teeth thereon, a ring gear mounted in said cover for rotation about an axis parallel to the longitudinal axis of the plunger-supporting rod and through which said rod passes, gear train means meshing with said ring gear and said rack teeth portion of said rod, a spiral spring connected at one end to said ring gear and at its other end to said cover, said spring being coiled around said ring gear between it and the cover.

2. The coffee-making device of claim 1 in which said cover is provided with a latch pin extending radially of the ring gear to the exterior of the cover and in which said ring gear is provided with a latch pin receiving hole in its periphery.

3. In a coffee-making device having a container with a cover, a plunger supported by the cover, motor means housed in the cover for moving the plunger downwardly in the container, and heating means, means for restraining the motor means comprising a latch pin mounted in the cover and engageable with the motor means, a temperature-responsive prime mover at the bottom of the container, a rod journaled on the outside of the container for rotary movement about its longitudinal axis, an arm fixed to the upper end of said rod, a releasable connection between said arm and said latch pin, an arm fixed to the lower end of said rod, and means operably connecting said latter arm and said prime mover.

References Cited by the Examiner
UNITED STATES PATENTS

| | | | |
|---|---|---|---|
| 1,211,614 | 1/1917 | Morales | 99—319 X |
| 1,887,848 | 11/1932 | Peirce | 99—282 |

FOREIGN PATENTS

| | | |
|---|---|---|
| 936,643 | 2/1948 | France. |
| 3,500 | 5/1912 | Great Britain. |
| 509,899 | 1/1955 | Italy. |

WALTER A. SCHEEL, *Primary Examiner.*

IRVING BUNEVICH, *Examiner.*

S. P. FISHER, *Assistant Examiner.*